(12) United States Patent
Banevicius et al.

(10) Patent No.: US 7,435,787 B2
(45) Date of Patent: Oct. 14, 2008

(54) PROCESS FOR THE CONTINUOUS PRODUCTION OF SILYLATED RESIN

(75) Inventors: John P. Banevicius, Clifton Park, NY (US); Misty Huang, New City, NY (US)

(73) Assignee: Momentive Performance Materials Inc., Wilton, CT (US)

( * ) Notice: Subject to any disclaimer, the term of this patent is extended or adjusted under 35 U.S.C. 154(b) by 149 days.

(21) Appl. No.: 11/226,694

(22) Filed: Sep. 14, 2005

(65) Prior Publication Data

US 2007/0060735 A1   Mar. 15, 2007

(51) Int. Cl.
   C08G 18/83   (2006.01)
   C08G 77/00   (2006.01)
   C08G 71/04   (2006.01)

(52) U.S. Cl. .............. 528/85; 528/10; 528/21; 528/25; 525/474

(58) Field of Classification Search ............ 528/85, 528/10, 21, 25
   See application file for complete search history.

(56) References Cited

U.S. PATENT DOCUMENTS

| | | | |
|---|---|---|---|
| 3,627,722 A * | 12/1971 | Seiter | 524/869 |
| 3,905,929 A | 9/1975 | Noll | |
| 4,119,613 A | 10/1978 | Reischl et al. | |
| 4,374,237 A * | 2/1983 | Berger et al. | 528/28 |
| 4,954,598 A * | 9/1990 | Baghdachi et al. | 528/22 |
| 5,147,927 A * | 9/1992 | Baghdachi et al. | 524/710 |
| 5,689,012 A | 11/1997 | Pazos et al. | |
| 5,908,913 A * | 6/1999 | Orthmann et al. | 528/49 |
| 5,959,027 A | 9/1999 | Jakubowski et al. | |
| 5,990,257 A * | 11/1999 | Johnston et al. | 528/28 |
| 6,087,440 A | 7/2000 | Skaggs et al. | |
| 6,350,824 B1 | 2/2002 | Baumann et al. | |
| 6,562,247 B2 | 5/2003 | Gillis et al. | |
| 6,884,852 B1 * | 4/2005 | Klauck et al. | 525/458 |
| 6,930,163 B2 * | 8/2005 | Brauer et al. | 528/76 |
| 2001/0053841 A1 * | 12/2001 | Kaufhold et al. | 528/48 |
| 2004/0198942 A1 | 10/2004 | Brauer et al. | |
| 2005/0171320 A1 * | 8/2005 | Brauer et al. | 528/76 |
| 2005/0215701 A1 * | 9/2005 | Porsch et al. | 524/589 |
| 2005/0271885 A1 * | 12/2005 | Stanjek et al. | 428/447 |

FOREIGN PATENT DOCUMENTS

| | | |
|---|---|---|
| DE | 2636709 | 2/1978 |
| DE | 10237270 | 3/2004 |
| EP | 1535940 | 6/2005 |
| WO | WO 01/91897 | 12/2001 |
| WO | 03/018658 | 3/2003 |
| WO | 2006/136261 | 12/2006 |

* cited by examiner

*Primary Examiner*—Randy Gulakowski
*Assistant Examiner*—Robert Loewe
(74) *Attorney, Agent, or Firm*—Dominick G. Vicari

(57) ABSTRACT

A process for the continuous production of silylated prepolymer includes continuously introducing a predetermined quantity of a polyol into at least one reaction zone; continuously introducing a silylating agent into the at least one reaction zone; continuously reacting the polyol under reaction conditions of temperature and time sufficient to produce a silylated prepolymer resin; and, continuously removing the silylated prepolymer resin from the at least one reaction zone.

27 Claims, 2 Drawing Sheets

PROCESS FOR THE CONTINUOUS PRODUCTION OF SILYLATED RESIN

BACKGROUND OF THE INVENTION

This invention relates to a continuous process for preparing silane modified polyurethane resin and then, if required, feeding directly into a continuous compounding process to make a sealant/adhesive/coating in one production line.

The conventional method of making alkoxysilane modified polyurethane prepolymers is to react polyols with isocyanate materials batchwise at elevated temperatures. The drawback of this well known method is long kettle time. Another drawback is difficult control of unwanted side reactions that increase viscosity. Another drawback is difficult scaleup from small units to larger production units.

What is needed is a continuous process to make the silane modified polyurethane resin and then also possibly feed it directly into a compounding process to make various products such as sealants/adhesives/coatings in one production line.

SUMMARY OF THE INVENTION

Provided herein is a process for the continuous production of silylated prepolymer. The process comprises: (a) continuously introducing a predetermined quantity of a polyol into at least one reaction zone; (b) continuously introducing a silylating agent into the at least one reaction zone; (c) continuously reacting the polyol under reaction conditions of temperature and time sufficient to produce a silylated prepolymer resin; and, (d) continuously removing the silylated prepolymer resin from the at least one reaction zone.

BRIEF DESCRIPTION OF THE DRAWINGS

Various embodiments of the invention are discussed below with respect to the drawings wherein.

DETAILED DESCRIPTION OF THE INVENTION

Figure 1:
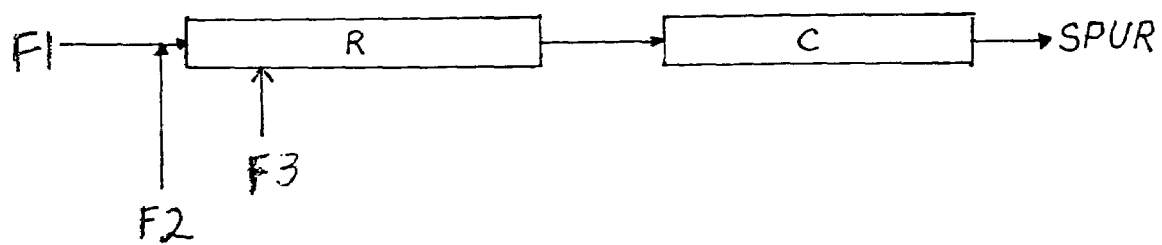
FIG. 1 is a diagrammatic illustration of an embodiment of the process of the invention.

The process and unit described here are useful for preparation of the prepolymers made of polyols, chain-extended or not, with silane modifiers. The polyols have average molecular weight (Mn) of above about 1000. The silane modifiers selected here contain functional groups which can react with either isocyanate or hydroxy groups. Chain extender used can be aliphatic or aromatic diisocyanates. Catalysts are optional. All composition percentages or parts are by weight unless indicated otherwise.

The produced prepolymers can be continuously fed into next unit to make sealants, adhesives or coatings.

The unit described in this invention is a continuous process consisting of metering pumps and piping that deliver the ingredients to a continuous reactor where the ingredients are mixed, heated, provided time & mixing to allow reactions, then cooled and discharged to product storage, or fed to another unit to make a compounded product such as sealants, adhesives, or coatings. In an embodiment of the invention multiple feed streams are employed to deliver the reactants to the one or more reactor tubes arranged in series at selected stages of the process.

In one embodiment of the invention the polyol is reacted with a polyisocyanate, the polyurethane product of this reaction being thereafter endcapped with a silylating agent such as an aminosilane or an isocyanatosilane. In one embodiment an excess of polyol is employed so that the polyurethane is terminated with hydroxyl groups. In this case the endcapping silylating agent is an isocyanatosilane. In another embodiment an excess of polyisocyanate is employed such that the resulting polyurethane is terminated with isocyanate groups. In this case the amonosilane is preferred. In each of these embodiments the silylating agent is added to the reaction zone in a separate stream downstream of the entry point of the polyol and polyisocyanate to allow an appropriate amount of time for the polymerization reaction by to proceed before endcapping.

However, use of the polyisocyanate is optional. In another embodiment of the invention the polyol is reacted with an isocyanatosilane to produce a resin product containing two urethane groups, i.e., the polyol itself is endcapped with silylated urethane groups.

More particularly, in an embodiment of the invention polyisocyanates used in making the prepolymer may be an aliphatic, cycloaliphatic, araliphatic or aromatic polyisocyanate. Examples of suitable polyisocyanates include ethylene diisocyanate, 1,6-hexamethylene diisocyanate, isophorone diisocyanate, cyclohexane-1,4-diisocyanate, 4,4'-dicyclohexylmethane diisocyanate, p-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate. Mixtures of polyisocyanates can be used and also polyisocyanates which have been modified by the introduction of urethane, allophanate, urea, biuret, carbodiimide, uretonimine or isocyanurate residues. Preferred isocyanates include toluene diisocyanate, diphenylmethane diisocyanate, polymeric diphenylmethane diisocyanate, cyclohexane diisocyanate, isophorone diisocyanate, naphthalene diisocyanate and phenylene diisocyanate.

The polymeric polyols may be members of any of the chemical classes of polymeric polyols used or proposed to be used in polyurethane formulations. In particular, they may be polyesters, polyesteramides, polyethers, polythioethers, polycarbonates, polyacetals, polyolefins or polysiloxanes. Where appropriate, the polyols may contain free tertiary amino groups. Preferred molecular weights are above about 1000.

Polyester polyols which may be used include hydroxyl-terminated reaction products of polyhydric alcohols such as ethylene glycol, propylene glycol, diethylene glycol, neopentyl glycol, 1,4-butanediol, furan dimethanol, cyclohexane dimethanol, glycerol, trimethylolpropane or pentaerythritol or mixtures thereof with polycarboxylic acids, especially dicarboxylic acids or their ester-forming derivatives, for example succinic, glutaric and adipic acids or their dimethyl esters, phthalic anhydride or dimethyl terephthalate. Polyesters obtained by the polymerisation of lactones, for example caprolactone, in conjunction with a polyol may also be used. Polyesteramides may be obtained by the inclusion of amino-alcohols such as ethanolamine in polyesterification mixtures. Polyesters containing free tertiary amino groups may be obtained by including tertiary amino polyols, for example triethanolamine or N-methyldiethanolamine in the polyesterification reaction.

Polyether polyols which may be used include products obtained by the polymerisation of a cyclic oxide, for example ethylene oxide, propylene oxide or tetrahydrofuran or by the addition of one or more such oxides to polyfunctional initiators, for example water, ethylene glycol, propylene glycol, diethylene glycol, cyclohexane dimethanol, glycerol, trimethylolpropane, pentaerythritol or Bisphenol A. Especially useful polyethers include polyoxypropylene diols and triols, poly(oxyethylene-oxypropylene) diols and triols obtained by the simultaneous or sequential addition of ethylene and propylene oxides to appropriate initiators and polytetramethylene ether glycols obtained by the polymerisation of tetrahydrofuran. Polyethers containing free tertiary amino groups may be obtained by the oxyalkylation, for example oxypropylation, of ammonia, primary or secondary amines and aminoalcohols. Examples of suitable amines include ethylene diamine, aniline, benzylamine, toluene diamines, diaminodiphenylmethane and polymethylene polyphenyl polyamines. Suitable aminoalcohols include ethanolamine, diethanolamine, triethanolamine, N-methyldiethanolamine, bis(2-hydroxyethyl)aniline, bis(2-hydroxypropyl)aniline and bis(2-hydroxyethyl)benzylamine. In the oxyalkylation process, mixtures of amino-containing and amino-free initiators may be used if desired.

Polythioether polyols which may be used include products obtained by condensing thiodiglycol either alone or with other glycols, dicarboxylic acids, formaldehyde, aminoalcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol and hexanediol with formaldehyde. Suitable polyacetals may also be prepared by polymerising cyclic acetals.

Suitable polyolefin polyols include hydroxy-terminated butadiene homo- and copolymers.

Diols having pendent polyoxyethylene chains which may be used in the preparation of the prepolymer include those described in the prior art, for example in U.S. Pat. No. 3,905,929.

Silanes useful in the invention include isocyanatosilanes and aminosilanes. For example, the isocyanatosilane can be a selected from the group consisting of 3-isocyanatopropylmethyldimethoxysilane, 3-isocyanatopropyltrimethoxysilane and 3-isocyanatopropyltriethoxysilane. A suitable isocyanatosilane is available from GE Silicones under the designation A Link-35. The aminosilanes can be, for example, selected from the group consisting of 4-amino-3,3-dimethylbutyltrimethoxysilane, 4-amino-3,3-dimethylbutyldimethoxymethylsilane, N-methyl-4-amino-3,3-dimethylbutyltrimethoxysilane, aminoisopropoxyethyltrimethoxysilane, aminoisopropoxypropyltrimethoxysilane, 4-amino-3,3-dimethylbutyltriethoxysilane, 4-amino-3,3-dimethylbutyldiethoxymethylsilane, N-methyl-4-amino-3,3-dimethylbutyltriethoxysilane and aminoisopropoxyethyltriethoxysilane.

In an embodiment of the invention a silane endcapping agents useful in the process of the invention can have the formula:

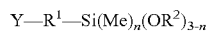

$$Y-R^1-Si(Me)_n(OR^2)_{3-n}$$

wherein Y is —NCO, —NHR, —NH$_2$, or —HS,

R is an alkyl group having from 1-10 carbon atoms,

R$^1$ is a divalent hydrocarbon group having from 1-10 carbon atoms,

Me is methyl,

OR$^2$ is an alkoxy group wherein R$^2$ has from 1 to 5 carbon atoms (e.g., methoxy, ethoxy, propoxy, etc.), and n=0 to 3.

The feeds can optionally include catalysts, plasticizers, colorants, stabilizers, thixotropes, fillers and the like.

Exemplary plasticizers include phthalates, dipropylene and diethylene glycol dibenzoates and mixtures thereof, epoxidized soybean oil and the like. Useful sources of dioctyl and diisodecyl phthalate include those available under the tradenames "Jayflex DOP" and "Jayflex DIDP" from Exxon Chemical. The dibenzoates are available as "Benzoflex 9-88", "Benzoflex 50" and "Benzoflex 400" from Velsicol Chemical Corporation. The plasticizer typically comprises up to 100 parts per hundred parts of the polymer with 40 to 80 parts per hundred being preferred.

Typical fillers include reinforcing fillers such as fumed silica, precipitated silica and calcium carbonates. To further improve the physical strength of the formulations, reinforcing carbon black can be used as a main filler, leading to black systems. Several commercial grades of carbon black useful in this invention are available, such as "Corax" products (Degussa). To obtain translucent formulations, higher levels of fumed silica or precipitated silica should be used as the main filler, without carbon black.

Treated calcium carbonates having particle sizes from 0.07 microns to 4 microns are preferred fillers and are available under several trade names, such as: "Ultra Pflex" and "Hi Pflex" from Specialty Minerals; "Winnofil SPM" and "Winnofil SPT" from Zeneca Resins; "Hubercarb 1Qt", "Hubercarb 3Qt" and "Hubercarb W" from Huber and "Kotomite" from ECC. These fillers can be used either alone or in combination. The fillers generally comprise up to 300 parts per 100 parts of the silylated polymer with 80 to 150 parts being the more preferred loading level.

UV stabilizers and/or antioxidants can be incorporated into the sealant formulations of this invention in an amount from 0 to 5 parts per hundred parts of silylated polymer with 0.5 to 2 parts being preferred. These materials are available from companies such as Great Lakes and Ciba Specialty Chemicals under the tradenames "Anox 20" and "Uvasil 299 HM/LM" (Great Lakes), and "Irganox 1010," "Irganox 1076," "Tinuvin 770," "Tinuvin 327," "Tinuvin 213" and "Tinuvin 622 LD" (Ciba), respectively.

The feed can include various thixotropic or anti-sagging agents. This class of additives are typified by various castor waxes, fumed silica, treated clays and polyamides. These additives typically comprise 1 to 10 parts per hundred parts of silylated polymer component with 1 to 6 parts being preferred. Useful thixotropes include those available as: "Aerosil" from Degussa, "Cab-O-Sil" from Cabot, "Castorwax" from CasChem, "Thixatrol" and "Thixcin" from Rheox, and "Disparlon" from King Industries.

Suitable catalysts are dialkyltin dicarboxylates, such as dibutyltin dilaurate and dibutyltin acetate, tertiary amines, the stannous salts of carboxylic acids, such as stannous octoate and stannous acetate, and the like.

The process includes metering of the reactants, mixing of the reactants (e.g., by static mixing elements in the tubular reactor(s), heating, drying, devolatilization, and grinding. The products include silane terminated polyurethanes (SPUR) which, in one embodiment of the invention, can be thereafter incorporated into sealant/adhesive. In another embodiment of the invention the sealant/adhesive can be produced by the continuous process described herein by the addition into a feed stream of the appropriate additives as described above.

The reactor is a tubular reactor with an internal static mixer. The ratio of length to diameter (L/D) can typically range from about 10:1 to about 50:1 although ratios outside of this range can be employed where appropriate. In an embodiment of the invention the reaction is typically conducted at a temperature of up to about 200° C. In another embodiment the reaction temperature can range from about 80° C. to about 170° C. In yet another embodiment the reaction temperature can range from about 120° C. to about 150° C. The reactants are linearly moved through the reactor(s). The residence time of reactants in the tubular reactor can typically be up to about 30 minutes, although any suitable residence time can be selected.

When more than one tubular reactor is employed, the reactors are arranged in series and can be of different diameters and lengths. The feed streams can be introduced at different points in the process.

Referring now to FIG. 1, a diagrammatic illustration of one embodiment of the process is presented wherein F1 is a feed stream containing polyol, and optionally various sealant/adhesive/coating additives such as described above. F2 is a feed stream containing a silylating agent (e.g., isocyanatosilane), which is introduced into the polyol feed stream F1 prior to entry into tubular reactor R. F3 is a feed stream containing catalyst which is introduced into tubular reactor R downstream of the inlet into which combined feeds F1 and F2 are introduced. Reactor R includes an internal static mixer and is heated by an external heat source to raise the contents of the reactor to the appropriate reaction temperature. The length of reactor R and the throughput rate are adjusted to provide a desired residence time for the contents of the reactor as they are moved linearly therethrough. An endapping reaction takes place in reactor R. The effluent from reactor R is directed to a cooler C, which cools the effluent to about 20 degrees C. The product is a silylated polyurethane SPUR.

Figure 2:
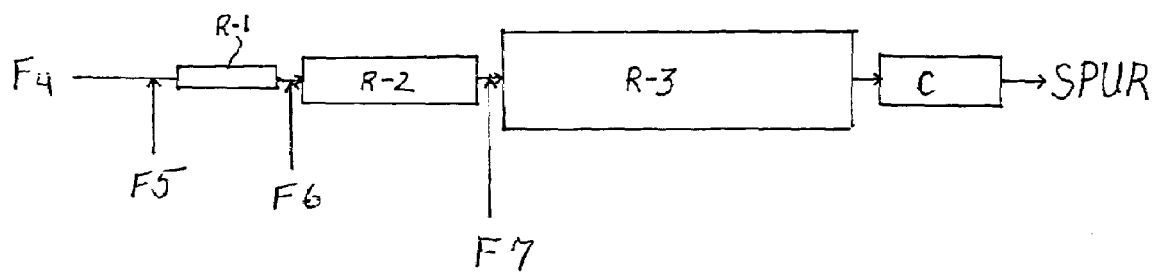
FIG. 2 is a diagrammatic illustration of another embodiment of the process of the invention.

Referring to FIG. 2 another embodiment of the process is illustrated in which three reactors R-1, R-2, and R-3, each having individually selected dimensions of diameter and length, are arranged in series. A diisocyanate feed F5 is combined with polyol feed F4 prior to entry into reactor R-1. A chain extension reaction occurs in reactor R-1. Optionally, the diisocyanate feed F5 also includes polyol. Optionally, the polyol feed F4 includes sealant/adhesive/coating additives such as described above. A silylating agent feed F6 is introduced between reactors R-1 and R-2. An endcapping reaction occurs in reactor R-2. Optionally, the silylating agent feed F6 can be introduced at other points in the process depending on the amount of chain extension desired. Feed F7 includes a catalyst and is introduced between reactor R-2 and R-3. The effluent of reactor R-3 is sent to cooler C. The product is a silylated polyurethane SPUR.

Various features of the invention are illustrated by the Examples presented below.

EXAMPLE 1 AND COMPARATIVE EXAMPLE

Acclaim 12,200 (polyol from Bayer) was pumped continuously to the reactor, at a rate of approximately 80 cubic centimeters per minute (cc/min), using a Zenith metering gear pump, size=10 cubic centimeters per revolution (cc/rev), operating at 8 revolutions per minute (rpm). A-Link 35 (isocyanato silane from GE) was pumped continuously to the reactor, at a rate of approximately 3 cc/min, using a Milton Roy metering piston pump. SUL-4 (dibutyltin dilaurate catalyst from Crompton) was preblended at 0.1% concentration with Acclaim 12,200; this preblend was pumped continuously to the reactor at approximately 5 cc/min, using a Zenith metering pump, size 0.584 cc/rev, operating at approximately 8.3 rpm.

The tubular reactor consisted of pipe containing internal static mixer elements (Koch-Sulzer SMX) to provide mixing. The process set up was similar to that illustrated in FIG. 1. The reactor was heated to approximately 100-180 degrees Celsius (C.) using electrical heat tape on the pipe. Temperature was measured by thermocouples. At the end of the reactor, a cooling water jacketed section of pipe cooled the product to approximately 20-80 degrees C.

The prepolymer product exited the continuous process and samples 1-3 were collected and tested. Testing by FTIR and titration showed complete reaction, less than 0.05 weight percent (wt %) isocyanate (NCO). Viscosity measurement showed less than 20,000 cp at 1 sec$^{-1}$ shear rate at 20 degrees C. Testing by curing overnight showed a tack-free film. For comparison purposes a sample was taken from a batch process and similarly tested. The mechanical properties testing of the prepolymers are similar to those made from batchwise preparation.

The following results were obtained as set forth in Table 1 below:

TABLE 1

| (SPUR Prepolymer Physical Properties) | | | | |
|---|---|---|---|---|
| Sample | Tensile Strength (psi) | Young's Modulus (psi) | Elongation % | Tear Resistance (lb/in) | Hardness (Shore A) |
| 1 | 74 | 122 | 85 | 10.4 | 26.5 |
| 2 | 105 | 179 | 83 | 9.6 | 25 |
| 3 | 79 | 108 | 108.2 | 8.3 | 28.5 |
| Comp. Ex (Batch) | | 140.1 | 100.8 | 9.1 | 25 |

Two sealant compositions were made from Sample 3, and tested for physical properties. The results are shown in Table 2 below.

TABLE 2

| (SPUR Sealant Physical Properties) | | | | | | | | |
|---|---|---|---|---|---|---|---|---|
| Ex. | Sp. Gr. | App. Rate | Day 1 Sp. Gr. | Shore A | Tensile | Day 7 Elongation | 50% Modulus | 100% Modulus |
| 3a | 1.530 | 588 | 1.574 | 51.0 | 201 | 165 | 151 | 177 |
| 3b | 1.402 | 1173 | 1.397 | 32.9 | 156 | 199 | 75 | 112 |

EXAMPLE 2

The process set up was similar to that shown in FIG. 2. Acclaim 12,200 polyol was reacted with Demodur I (isophorone diisocyanate, IPDI, from Bayer), in the presence of SUL-4 catalyst, and also capping with A-Link 35 silane. Chain extender (IPDI) and capping agent (A-Link35) were added separately, although they can alternatively be added together. The following composition amounts were used: 72.62 parts by weight of polyol, 3.73 parts of 20% IPDI in polyol, 7 parts of 0.1% catalyst in polyol, and 1.44 parts capping agent. Temperatures and catalyst compositions were varied and samples taken and tested. The results are shown below in Table 3.

TABLE 3

|  | Sample S-1 | Sample S-2 | Sample S-3 |
|---|---|---|---|
| Catalyst, ppm | 15 | 20 | 20 |
| Temperature Reactor R-2, °C. | 80 | 80 | 100 |
| Temperature Reactor R-3, °C. | 150 | 150 | 170 |
| Throughput rate, g/min | 83 | 83 | 83 |
| Viscosity of sample, centipoises | 28,000 | 38,000 | 58,000 |
| Percent NCO | 0.034 | 0.034 | 0.029 |

While the above description contains many specifics, these specifics should not be construed as limitations of the invention, but merely as exemplifications of preferred embodiments thereof. Those skilled in the art will envision many other embodiments within the scope and spirit of the invention as defined by the claims appended hereto.

What is claimed is:

1. A process for the continuous production of silylated prepolymer resin which comprises:
   a) continuously metering into a feed line a predetermined quantity of reactants to form a mixture comprising:
      (i) a polyol;
      (ii) a silylating agent; and
      (iii) optionally, at least one additive;
   b) continuously introducing the mixture of step (a) into a first tubular reactor with an internal static mixer with a ratio of length to diameter of from about 10:1 to about 50:1 and preheated using an external heat source to a temperature ranging from about 120° C. up to about 200° C.;
   c) continuously mixing, heating to the reaction temperature, drying, devolatilizing and grinding the mixture of step (b) in the tubular reactor with an internal static mixer;
   d) continuously feeding a stream containing catalysts which is introduced into a second tubular reactor downstream of the inlet into which combined feeds (i), (ii) and, optionally, (iii) are introduced;
   e) continuously reacting the ingredients of step (d) as the ingredients move linearly through the second tubular reactor under reaction conditions of temperature and time sufficient to complete the endcapping reaction in the tubular reactor and produce a silylated prepolymer resin; and,
   f) continuously removing the silylated prepolymer resin from the second tubular reactor and directing the silylated prepolymer resin continuously into a cooler which cools the silylated prepolymer resin to a temperature of from about 20° C. to about 80° C.

2. The process of claim 1 wherein the polyol is selected from the group consisting of polyester polyols, polyesteramide polyols, polyether polyols, polythioether polyols, polycarbonate polyols, polyacetal polyols, polyolefin polyols and polysiloxane polyols.

3. The process of claim 1 wherein the silylating agent is an isocyanatosilane.

4. The process of claim 3 wherein the isocyanatosilane is selected from the group consisting of 3-isocyanatopropylmethyldimethoxysilane, 3-isocyanatopropyltrimethoxysilane and 3-isocyanatopropyltriethoxysilane.

5. The process of claim 1 wherein the polyol is reacted with a polyisocyanate prior to the addition of the silylating agent to provide a polymer having repeating urethane groups.

6. The process of claim 5 wherein the polyisocyanate is selected from the group consisting of ethylene diisocyanate, 1,6-hexamethylene diisocyanate, isophorone diisocyanate, cyclohexane-1,4-diisocyanate, 4,4'-dicyclohexylmethane diisocyanate, p-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate.

7. The process of claim 5 wherein an excess of polyol is reacted with the polyisocyanate so as to produce a polyurethane terminated with hydroxyl groups.

8. The process of claim 1 wherein the silylating agent corresponds to the formula:

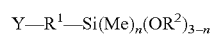

wherein
Y is —NCO,
R is an alkyl group having from 1-10 carbon atoms,
$R^1$ is a divalent hydrocarbon group having from 1-10 carbon atoms,
Me is methyl,
$OR^2$ is an alkoxy group wherein $R^2$ has from 1 to 5 carbon atoms, and
n=0 to 3.

9. The process of claim 1 wherein the silylated prepolymer is continuously blended with one or more additives for providing a finished product.

10. The process of claim 9 wherein the finished product is a sealant and/or adhesive and/or coating composition.

11. The process of claim 9 wherein the additive comprises one or more compounds selected from the group consisting of plasticizers, colorants, stabilizers, thixotropes and fillers.

12. A process for the continuous production of silylated prepolymer resin which comprises:
   a) continuously metering into a feed line a predetermined quantity of reactants to form a mixture comprising:
      (i) a polyol;
      (ii) a polyisocyanate; and
      (iii) optionally, plasticizers, colorants, stabilitizers, thixotropes, and fillers;
   b) continuously introducing the premixed reactants of step (a) into a first tubular reactor with an internal static mixer with a ratio of length to diameter of from about 10:1 to about 50:1 and preheated using an external heat source to a temperature ranging from about 80° C. up to about 200° C.;
   c) continuously mixing, heating to the reaction temperature, drying, devolatilizing and grinding the mixture of step (b) in the first tubular reactor with an internal static mixer and moving the mixture from the first tubular reactor to a second tubular reactor;
   d) continuously introducing a stream containing catalysts to the mixture of step (c) at a position between the first tubular reactor and the second tubular reactor;
   e) continuously moving the mixture linearly through the second tubular reactor, said second tubular reactor including an internal static mixer with a ratio of length to diameter of from about 10:1 to about 50:1, and preheating the mixture of reactants and catalyst of step (d) using an external heat source to a temperature ranging from about 80° C. up to about 200° C. under reaction conditions of temperature and time sufficient to cause a chain extension reaction to occur to provide a polymer having repeating urethane groups so as to produce a polyurethane with hydroxyl groups; and f) continuously introducing a predetermined quantity of silylating agent to the mixture of step (e) between the second tubular reactor and a third tubular reactor;
g) continuously introducing the mixture of step (f) exiting the second tubular reactor into the third tubular reactor, wherein the third tubular reactor includes an internal static mixer with a ratio of length to diameter of from about 10:1 to about 50:1 and preheated using an external heat source to a temperature ranging from about 120° C. up to about 200° C.;
h) continuously reacting the ingredients of step (g) as the ingredients move linearly through the third tubular reactor under reaction conditions of temperature and time sufficient to complete the endcapping reaction in the third tubular reactor and produce a silylated prepolymer resin; and
i) continuously removing the silylated prepolymer resin from the third tubular reactor and cooling the silylated prepolymer resin in a cooler to a temperature from about 20° C. to about 80° C.

13. The process of claim 12 wherein the polyol is selected from the group consisting of polyester polyols, polyesteramide polyols, polyether polyols, polythioether polyols, polycarbonate polyols, polyacetal polyols, polyolefin polyols and polysiloxane polyols.

14. The process of claim 12 wherein the silylating agent is an isocyanatosilane.

15. The process of claim 12 wherein the isocyanatosilane is selected from the group consisting of 3-isocyanatopropylmethyldimethoxysilane, 3-isocyanatopropyltrimethoxysilane and 3-isocyanatopropyltriethoxysilane.

16. The process of claim 15 wherein the polyol is reacted with a polyisocyanate prior to the addition of the silylating agent to provide a polymer having repeating urethane groups so as to produce a polyurethane with hydroxyl groups.

17. The process of claim 16 wherein the polyisocyanate is selected from the group consisting of ethylene diisocyanate, 1,6-hexamethylene diisocyanate, isophorone diisocyanate, cyclohexane-1,4-diisocyanate, 4,4'-dicyclohexylmethane diisocyanate, p-xylylene diisocyanate, 1,4-phenylene diisocyanate, 2,4-toluene diisocyanate, 2,6-toluene diisocyanate, 4,4'-diphenylmethane diisocyanate, 2,4'-diphenylmethane diisocyanate, polymethylene polyphenyl polyisocyanates and 1,5-naphthylene diisocyanate.

18. A process for the continuous production of silylated prepolymer resin which comprises:
a) continuously metering into a feed line a predetermined quantity of reactants to form a mixture comprising:
(i) a polyol;
(ii) an excess of polyisocyanate; and
(iii) optionally, plasticizers, colorants, stabilitizers, thixotropes, and fillers;
b) continuously introducing the premixed reactants of the feed line step (a) into a first tubular reactor with an internal static mixer with a ratio of length to diameter of from about 10:1 to about 50:1 and preheated using an external heat source to a temperature ranging from about 80° C. up to about 200° C.;
c) continuously mixing, heating to the reaction temperature, drying, devolatilizing and grinding the mixture of step (b) in the tubular reactor with an internal static mixer and moving the mixture from the first tubular reactor to a second tubular reactor;
d) continuously introducing a stream containing catalysts to the mixture of step (c) between the first tubular reactor and the second tubular reactor;
e) continuously moving the mixture linearly through the second tubular reactor, said second tubular reactor including an internal static mixer with a ratio of length to diameter of from about 10:1 to about 50:1 and preheating the mixture of reactants and catalyst of step (d) using an external heat source to a temperature ranging from about 80° C. up to about 200° C. under reaction conditions of temperature and time sufficient to cause a chain extension reaction to occur and to provide a polymer having repeating urethane groups so as to produce a polyurethane with isocyanate groups; and
f) continuously introducing a predetermined quantity of silylating agent to the mixture of step (e) between the second tubular reactor and a third tubular reactor;
g) continuously introducing the mixture of step (f) into the third tubular reactor, said third tubular reactor having an internal static mixer with a ratio of length to diameter of from about 10:1 to about 50:1 and preheated using an external heat source to a temperature ranging from about 120° C. up to about 200° C.;
h) continuously reacting the ingredients of step (g) as the ingredients move linearly through the third tubular reactor under reaction conditions of temperature and time sufficient to complete the endcapping reaction in the tubular reactor and produce a silylated prepolymer resin; and
i) continuously removing the silylated prepolymer resin from the third tubular reactor and directing the silylated prepolymer resin into a cooler which cools the silylated prepolymer resin to a temperature from about 20° C. to about 80° C.

19. The process of claim 18 wherein an excess of polyisocyanate is reacted with the polyol so as to produce a polyurethane terminated with isocyanate groups.

20. The process of claim 19 wherein the silylating agent is an aminosilane.

21. The process of claim 20 wherein the aminosilane is selected from the group consisting of 4-amino-3,3-dimethylbutyltrimethoxysilane, 4-amino-3,3-dimethylbutyldimethoxymethylsilane, N-methyl-4-amino-3,3-dimethylbutyltrimethoxysilane, aminoisopropoxyethyltrimethoxysilane, aminoisopropoxypropyltrimethoxysilane, 4-amino-3,3-dimethylbutyltriethoxysilane, 4-amino-3,3-dimethylbutyldiethoxymethylsilane, N-methyl-4-amino-3,3-dimethylbutyltriethoxysilane and aminoisopropoxyethyltriethoxysilane.

22. The process of claim 18 wherein the silylating agent is an aminosilane.

23. The process of claim 22 wherein the aminosilane is selected from the group consisting of 4-amino-3,3-dimethylbutyltrimethoxysilane, 4-amino-3 ,3-dimethylbutyldimethoxymethylsilane, N-methyl-4-amino-3,3-dimethylbutyltrimethoxysilane, aminoisopropoxyethyltrimethoxysilane, aminoisopropoxypropyltrimethoxysilane, 4-amino-3,3-dimethylbutyltriethoxysilane, 4-amino-3,3-dimethylbutyldiethoxymethylsilane, N-methyl-4-amino-3,3-dimethylbutyltriethoxysilane and aminoisopropoxyethyltriethoxysilane.

24. The process of claim 18 wherein the silylating agent corresponds to the formula:

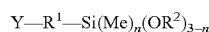

wherein
Y is —NHR, —NH$_2$, or —SH,
R is an alkyl group having from 1-10 carbon atoms,
R$^1$ is a divalent hydrocarbon group having from 1-10 carbon atoms, Me is methyl,
OR² is an alkoxy group wherein $R^2$ has from 1 to 5 carbon atoms, and
n=0 to 3.

25. The process of claim 18 wherein the silylated prepolymer is continuously blended with one or more additives for providing a finished product.

26. The process of claim 25 wherein the finished product is a sealant and/or adhesive and/or coating composition.

27. The process of claim 25 wherein the additive comprises one or more compounds selected from the group consisting of plasticizers, colorants, stabilizers, thixotropes and fillers.

* * * * *